United States Patent
Chang et al.

(10) Patent No.: US 11,795,080 B2
(45) Date of Patent: Oct. 24, 2023

(54) MICROBIAL CARRIER AND DEVICE FOR TREATING WASTEWATER

(71) Applicant: INDUSTRIAL TECHNOLOGY RESEARCH INSTITUTE, Hsinchu (TW)

(72) Inventors: Ting-Ting Chang, Taichung (TW); Kuan-Foo Chang, Hsinchu (TW); Cheng-Chin Chang, Toufen (TW); Yi-Chun Liu, Zhudong Township (TW); Mei-Chih Peng, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 181 days.

(21) Appl. No.: 17/565,872

(22) Filed: Dec. 30, 2021

(65) Prior Publication Data

US 2023/0212046 A1   Jul. 6, 2023

(51) Int. Cl.
| | |
|---|---|
| *C02F 3/10* | (2023.01) |
| *C02F 3/34* | (2023.01) |
| *C02F 3/28* | (2023.01) |
| *C02F 3/30* | (2023.01) |
| C02F 101/16 | (2006.01) |
| C02F 103/34 | (2006.01) |

(52) U.S. Cl.
CPC ............ *C02F 3/108* (2013.01); *C02F 3/2806* (2013.01); *C02F 3/302* (2013.01); *C02F 3/307* (2013.01); *C02F 3/341* (2013.01); *C02F 3/105* (2013.01); *C02F 2101/16* (2013.01); *C02F 2103/346* (2013.01)

(58) Field of Classification Search
CPC ........ C02F 3/108; C02F 3/2806; C02F 3/302; C02F 3/307; C02F 3/341; C02F 3/105; C02F 2101/16; C02F 2103/346
USPC ............... 210/150, 151, 615, 616, 617, 618; 435/177, 180, 182
See application file for complete search history.

(56) References Cited

U.S. PATENT DOCUMENTS

| | | | |
|---|---|---|---|
| 8,445,253 B2 | 5/2013 | Vanotti et al. | |
| 8,574,885 B2 | 11/2013 | Vanotti et al. | |
| 9,212,358 B2 | 12/2015 | Razavi-Shirazi et al. | |

(Continued)

FOREIGN PATENT DOCUMENTS

| | | |
|---|---|---|
| CN | 102786147 A | 11/2012 |
| CN | 106139913 A | 11/2016 |

(Continued)

OTHER PUBLICATIONS

Taiwanese Office Action and Search Report for Taiwanese Application No. 110149701, dated Aug. 29, 2022.

*Primary Examiner* — Fred Prince
(74) *Attorney, Agent, or Firm* — Birch, Stewart, Kolasch & Birch, LLP

(57) ABSTRACT

A microbial carrier and a device for treating wastewater are provided. The microbial carrier includes a bacteriophilic material and a plurality of foam cells, wherein the foam cells are disposed in the bacteriophilic material. The bactericidal material is a reaction product of a composite, wherein the composition includes a hydrophobic polyvinyl alcohol and a cross-linking agent, wherein the surface energy of the hydrophobic polyvinyl alcohol is 30 mJ/m$^2$ to 58 mJ/m$^2$.

18 Claims, 2 Drawing Sheets

(56) References Cited

U.S. PATENT DOCUMENTS

| | | |
|---|---|---|
| 10,081,804 B2 | 9/2018 | Bae et al. |
| 10,584,047 B2 | 3/2020 | Shirazi et al. |
| 10,752,528 B2 | 8/2020 | Razavi-Shirazi et al. |
| 2012/0000853 A1* | 1/2012 | Tuteja .................. C10G 21/00 427/244 |
| 2013/0153493 A1 | 6/2013 | Young et al. |
| 2014/0353248 A1* | 12/2014 | Oka ..................... C02F 3/108 210/150 |
| 2016/0167993 A1 | 6/2016 | Razavi-Shirazi et al. |
| 2018/0093908 A1 | 4/2018 | Chidambaran et al. |
| 2021/0147270 A1 | 5/2021 | Udagawa et al. |
| 2021/0171373 A1 | 6/2021 | Zenki et al. |

FOREIGN PATENT DOCUMENTS

| | | |
|---|---|---|
| CN | 108529739 A | 9/2018 |
| CN | 110272894 A | 9/2019 |
| CN | 109970216 B | 10/2020 |
| CN | 107828777 B | 3/2021 |
| CN | 108060156 B | 4/2021 |
| CN | 112960776 A | 6/2021 |
| CN | 110498506 B | 8/2021 |
| CN | 111675320 B | 9/2021 |
| TW | I424940 B | 2/2014 |
| TW | I621843 B | 4/2018 |
| TW | 201927705 A | 7/2019 |

\* cited by examiner

MICROBIAL CARRIER AND DEVICE FOR TREATING WASTEWATER

TECHNICAL FIELD

The disclosure relates to a microbial carrier and a device for treating wastewater.

BACKGROUND

Wastewater with high ammonia nitrogen concentration usually exists in high-tech industries, such as semiconductor manufacturing and light-emitting diode (LED) manufacturing. Due to its production process, the main use of ammonia gas or ammonia water, wastewater with a high concentration of ammonia nitrogen is discharged into wastewater treatment plants.

The conventional biological treatment of ammonia nitrogen is nitrification-denitrification, which involves a series of biological reactions, using ammonia oxidation bacteria (AOB) to oxidize ammonia nitrogen to form nitrite nitrogen. Next, nitrite oxidation bacteria (NOB) oxidizes the nitrite nitrogen to form nitrate nitrogen. Finally, the nitrate nitrogen is subjected to a reduction to form nitrogen in the presence of denitrifying bacteria. Since the conventional biological treatment of ammonia nitrogen employs a large amount of aeration and an additional organic substance must be added as a carbon source for the denitrification reaction, the overall operation is energy consuming and the operational cost is high.

At present, an anaerobic ammonium oxidation (anammox process) is a relatively novel ammonia nitrogen treatment method. The anammox process uses carbon dioxide ($CO_2$) existing in nature as a carbon source under anaerobic conditions, ammonia nitrogen as an electron donor, and nitrite nitrogen as an electron acceptor. The process of trivalent electron transport reaction to generate nitrogen is not as costly or energy consuming as a traditional nitrogen removal process, and it does not require a large amount of oxygen to convert ammonia nitrogen into nitrate nitrogen. Moreover, the process does not require an organic carbon source to perform a denitrification reaction.

Due to the biochemical reaction of anammox microorganisms, ammonia nitrogen and nitrite nitrogen (serving as an electron acceptor) must coexist in the reaction. In addition, there is no nitrite nitrogen in the ammonia nitrogen wastewater. It is necessary to oxidize partial ammonia nitrogen to nitrite nitrogen using another microorganism (such as ammonia oxidation bacteria (AOB)) at first, and then nitrogen gas is formed via an anammox reaction by anammox microorganism.

Since ammonia nitrogen processes are, in general, performed under a high shear flow environment, it is necessary to have a carrier with sufficient mechanical strength to carry microorganisms. The commercial rigid microbial carrier are mainly made of polyurethane (PU) or high density polyethylene (HDPE). The low adhesion of anammox bacteria and ammonia oxidation bacteria (AOB) to the microbial carrier due to the high surface energy of such materials (such as PU or HDPE) results in the decrease of the total nitrogen degradation rate and the total nitrogen removal rate when treating wastewater.

SUMMARY

The disclosure provides a microbial carrier. According to embodiments of the disclosure, the microbial carrier comprises a bacteriophilic material and a plurality of foam cells, wherein the foam cells are disposed in the bacteriophilic material. The bacteriophilic material is a reaction product of a composition, wherein the composition includes a hydrophobic polyvinyl alcohol (PVA) and a crosslinking agent, wherein the surface energy of the hydrophobic polyvinyl alcohol is 30 $mJ/m^2$ to 58 $mJ/m^2$.

The disclosure also provides a device for treating wastewater in order to remove a pollutant from the wastewater. The device includes the microbial carrier of the disclosure and a microorganism disposed on the microbial carrier.

A detailed description is given in the following embodiments.

DETAILED DESCRIPTION

Figure 1:
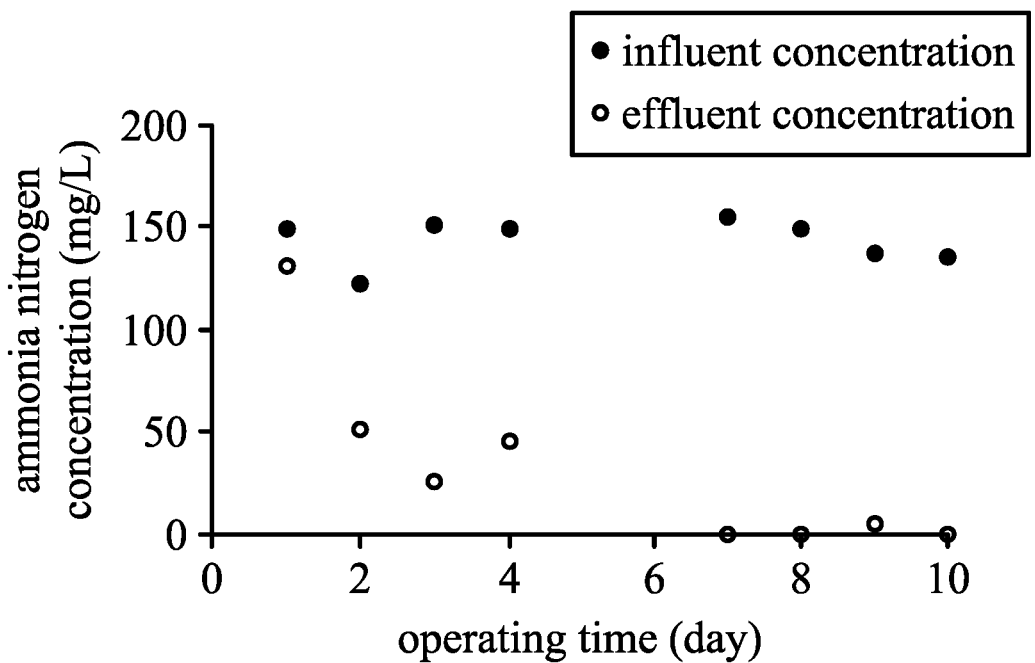
FIG. 1 is a graph plotting the influent concentration and the effluent concentration against operation time of the microbial carrier (1) in Example 1 of the disclosure in the purification treatment test of nitrogen-containing compound.

The microbial carrier and device for treating wastewater of the disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. As used herein, the term "about" in quantitative terms refers to plus or minus an amount that is general and reasonable to persons skilled in the art. As used herein, the term "about" in quantitative terms refers to plus or minus an amount that is general and reasonable to persons skilled in the art.

Moreover, the use of ordinal terms such as "first", "second", "third", etc., in the disclosure to modify an element does not by itself connote any priority, precedence, or order of one claim element over another or the temporal order in which it is formed, but are used merely as labels to distinguish one claim element having a certain name from another element having the same name (but for use of the ordinal term) to distinguish the claim elements.

The disclosure provides a microbial carrier and device for treating wastewater. The microbial carrier of the disclosure includes a bacteriophilic material and a plurality of foam cells, wherein the bacteriophilic material is prepared from a hydrophobic polyvinyl alcohol (PVA) and a crosslinking agent. Due to the low surface energy of the hydrophobic polyvinyl alcohol (PVA), the microbial carrier of the disclosure is suitable for forcing a microorganism (such as anammox bacteria and ammonia oxidation bacteria (AOB)) rapidly adhering on the microbial carrier. In addition, since the microbial carrier of the disclosure has advantages of high hardness, low abrasion, high roughness, and high specific surface area, the adhesion of microorganism to the carrier (compared with the conventional high density polyethylene (PE)) can be improved, in addition to being suitable for operation in high water shear environment. Furthermore, when the microbial carrier of the disclosure is used for treating the wastewater, various microorganisms (such as anammox bacteria and ammonia oxidation bacteria (AOB)) can rapidly adhere on and massively exist in the same microbial carrier, thereby enhancing the total nitrogen degradation rate and total nitrogen removal rate of the wastewater treatment. As a result, the nitrogen-containing compound (such as ammonia nitrogen, nitrite nitrogen) in the wastewater can be altered effectively to nitrogen gas.

According to embodiments of the disclosure, the disclosure provides a microbial carrier, can include a bacteriophilic material and a plurality of foam cells. According to embodiments of the disclosure, the foam cells are disposed in the bacteriophilic material, wherein the bacteriophilic material is a reaction product of a composition. According to embodiments of the disclosure, the composition can include a hydrophobic polyvinyl alcohol (PVA) and a crosslinking agent. According to embodiments of the disclosure, the weight ratio of the hydrophobic polyvinyl alcohol (PVA) to the crosslinking agent can be about 1:9 to 4:6, such as about 2:8, or 3:7. According to embodiments of the disclosure, the composition may consist of the hydrophobic polyvinyl alcohol (PVA) and the crosslinking agent.

According to embodiments of the disclosure, the hydrophobic polyvinyl alcohol (PVA) of the disclosure can be prepared by reacting a non-modified polyvinyl alcohol (PVA) (or a polyvinyl alcohol (PVA) resin which is partially crosslinked by boric acid) with a modifier. According to embodiments of the disclosure, the modifier can be a siloxane having a $C_{6-18}$ alkyl group, a siloxane having a $C_{6-22}$ alkenyl group, a succinic anhydride having a $C_{6-18}$ alkyl group, a succinic anhydride having $C_{6-22}$ alkenyl group, an isocyanate having a $C_{6-18}$ alkyl group, an isocyanate having a $C_{6-22}$ alkenyl group, or a lactone having 3-7 carbon atoms.

According to embodiments of the disclosure, the modifier can be $Si(R^2)_4$,

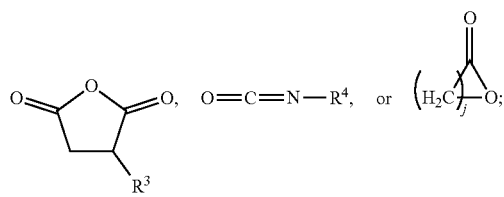

$R^2$ are independently $C_{1-6}$ alkoxy group, $C_{6-18}$ alkyl group, or $C_{6-22}$ alkenyl group, and at least one of $R^2$ is $C_{6-18}$ alkyl group, or $C_{6-22}$ alkenyl group, and at least one of $R^2$ is $C_{1-6}$ alkoxy group; $R^3$ and $R^4$ is $C_{6-18}$ alkyl group, or $C_{6-22}$ alkenyl group; and, j is 3 to 7. For example, the modifier can be hexyltriethoxysilane, octyltriethoxysilane, decyltriethoxysilane, dodecyltriethoxysilane, hexadecyltrimethoxysilane, octadecyltriethoxysilane, decenyltrimethoxysilane, dodecenyltriethoxysilane, decyl succinic anhydride, dodecyl succinic anhydride, octadecyl succinic anhydride, docosyl succinic anhydride, decenyl succinic anhydride, dodecenyl succinic anhydride, octadecenyl succinic anhydride, docosenyl succinic anhydride, hexyl isocyanate, octyl isocyanate, dodecyl isocyanate, octadecyl isocyanate, dodecenyl isocyanate, octadecenyl isocyanate, γ-butyrolactone (GBL), δ-valerolactone, ε-caprolactone, or a combination thereof.

According to embodiments of the disclosure, the crosslinking agent can be $C_{1-9}$ aldehyde, aliphatic polyisocyanate, or a combination thereof. According to embodiments of the disclosure, the crosslinking agent can be formaldehyde, acetaldehyde, glyoxal, methylglyoxal, propionaldehyde, acrolein, malondialdehyde, butyraldehyde, valeraldehyde, glutaraldehyde, hexanal, heptaldehyde, benzaldehyde, anisaldehyde, cuminaldehyde or a combination thereof.

According to embodiments of the disclosure, the crosslinking agent of the disclosure can be an aliphatic polyisocyanate, in order to avoid the use of aldehyde compound serving as the crosslinking agent. According to embodiments of the disclosure, the crosslinking agent of the disclosure can be 2,4-toluene diisocyanate, 2,5-toluene diisocyanate, 2,6-toluene diisocyanate, hexamethylene diisocyanate, pentamethylene diisocyanate, isophorone diisocyanate, 4,4'-methylene dicyclohexyl diisocyanate, 4,4'-methylenediphenyl diisocyanate, or a combination thereof.

According to embodiments of the disclosure, the composition for preparing the bacteriophilic material of the disclosure can further include a catalyst in order to accelerate the crosslinking reaction of the composition. According to embodiments of the disclosure, the amount of the catalyst can be 0.01 wt % to 5 wt %, based on the weight of the hydrophobic polyvinyl alcohol (PVA) and the crosslinking agent. According to embodiments of the disclosure, the catalyst can be bismuth nitrate, lead 2-ethylhexoate, lead benzoate, ferric chloride, antimony trichloride, hydroxyl group antimony glycolate, stannous salts of carboxylic acids, zinc salts of carboxylic acids, dialkyl tin salts of carboxylic acids, glycine salts, tertiary amine trimerization catalysts, quaternary ammonium carboxylates, alkali metal carboxylic acid salts, potassium acetate, potassium octoate, potassium 2-ethylhexanoate, N-(2-hydroxy-5-nonylphenol) methyl-N-methylglycinate, tin (II) 2-ethylhexanoate, dibutyltin dilaurate, or a combination thereof. According to embodiments of the disclosure, the aforementioned composition may consist of hydrophobic polyvinyl alcohol (PVA), crosslinking agent, and catalyst.

According to embodiments of the disclosure, a surface energy of the hydrophobic polyvinyl alcohol can be about 30 mJ/m² to 58 mJ/m², such as 33 mJ/m² to 58 mJ/m², 35 mJ/m² to 58 mJ/m², 37 mJ/m² to 58 mJ/m², or 33 mJ/m² to 56 mJ/m². The surface energy of the hydrophobic polyvinyl alcohol of the disclosure can be optionally modified (by the number of hydrophobic functional groups of the polyvinyl alcohol (PVA) or the bond length of the hydrophobic functional group) to reduce the surface energy difference between the microbial carrier of the disclosure and the targeted microorganism and to increase the adhesion of the microorganism on the microbial carrier of the disclosure. According to embodiments of the disclosure, since the bacteriophilic material of the disclosure is prepared from the hydrophobic polyvinyl alcohol (PVA), the surface energy of the bacteriophilic material can also be 30 mJ/m² to 58 mJ/m². Herein, the surface energy of the disclosure is determined by measuring the contact angle in use of pure water and formamide and calculating the solid surface energy by wetting tension.

According to embodiments of the disclosure, the Shore D hardness of the microbial carrier of the disclosure can be about 50 to 80, such as about 51, 52, 53, 54, 55, 56, 57, 58, 59, 60, 61, 62, 63, 64, 65, 66, 67, 68, 69, 70, 71, 72, 73, 74, 75, 76, 77, 78, or 79. According to embodiments of the disclosure, the abrasion of the microbial carrier is 100 mg/1000 cycles to 200 mg/1000 cycles. When the hardness or abrasion of the microbial carrier is too low, the microbial carrier is not suitable for high water flow shear environment. Herein, the hardness (Shore Hardness A) is determined by the method according to ASTM D-2240. The abrasion is determined by the method according to ASTM D4060 (at 1000 cycles, grinding wheel CS-17 mg, and 1000 g weight), in order to measure Taber abrasion resistance.

According to embodiments of the disclosure, the microbial carrier of the disclosure can have an average pore diameter of about 100 μm to 600 μm, such as about 150 μm to 600 μm, or 200 μm to 500 μm. In addition, according to embodiments of the disclosure, the porosity of the microbial carrier of the disclosure can be 25 to 60%, such as 25% to 30%, or 30% to 40%, or 40% to 50%, or 50% to 56%. In addition, according to embodiments of the disclosure, the specific surface area of the microbial carrier of the disclosure can be about 4000 m$^2$/m$^3$ to 7000 m$^2$/m$^3$, such as 4500 m$^2$/m$^3$ to 7000 m$^2$/m$^3$, 4800 m$^2$/m$^3$ to 7000 m$^2$/m$^3$, or 5000 m$^2$/m$^3$ to 7000 m$^2$/m$^3$. When the average porosity or specific surface area of the microbial carrier of the disclosure is too low, the microorganism is not apt to rapidly adhere on the microbial carrier of the disclosure. When the average pore diameter of the microbial carrier of the disclosure is too small, the speed of the water flow passing through the pores is increased, and the detention period of the microorganism around the pores is shortened, resulting in reduction in the adhesion of the microorganism on the microbial carrier of the disclosure. Therefore, the microbial carrier of the disclosure exhibits larger adhesion of microorganism, when controlling the average pore diameter and the porosity in a suitable range (for example the average pore diameter is 200 μm to 400 μm, and the porosity is 25% to 60%). Herein, the average pore diameter and specific surface area are measured by multifunctional 3D XCT (BRUKER SKYSCAN 2211).

According to embodiments of the disclosure, when carrying the microorganism with the microbial carrier of the disclosure, the total adhesion of the microorganism can be 8 mg$_{vss}$/g$_{carrier}$ to 50 mg$_{vss}$/g$_{carrier}$, such as 8 mg$_{vss}$/g$_{carrier}$ to 45 mg$_{vss}$/g$_{carrier}$, 10 mg$_{vss}$/g$_{carrier}$ to 50 mg$_{vss}$/g$_{carrier}$, 15 mg$_{vss}$/g$_{carrier}$ to 50 mg$_{vss}$/g$_{carrier}$, or 20 mg$_{vss}$/g$_{carrier}$ to 50 mg$_{vss}$/g$_{carrier}$. Herein, the total adhesion of microorganism is evaluated by the method for detecting volatile solids in sludge announced by the Environmental Inspection Institute (NIEA R212.02 C).

According to embodiments of the disclosure, the hydrophobic polyvinyl alcohol (PVA) of the disclosure can include a first repeating unit and a second repeating unit, wherein the first repeating unit having a structure represented by Formula (I), and second repeating unit having a structure represented by Formula (II).

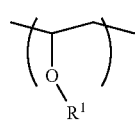

Formula (I)

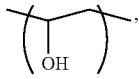

Formula (II)

wherein R$^1$ is —Si(R$^2$)$_3$,

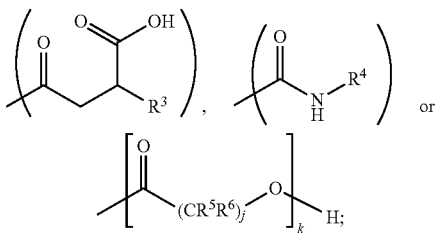

R$^2$ are independently C$_{1-6}$ alkoxy group, C$_{6-18}$ alkyl group, or C$_{6-22}$ alkenyl group, and at least one of R$^2$ is C$_{6-18}$ alkyl group, or C$_{6-22}$ alkenyl group; R$^3$ and R$^4$ are independently C$_{6-18}$ alkyl group, or C$_{6-22}$ alkenyl group; R$^5$ and R$^6$ are independently hydrogen, fluorine, methyl or ethyl; j is 3 to 7; and k is 1 to 30. According to embodiments of the disclosure, the hydrophobic polyvinyl alcohol (PVA) has n number of first repeating units and m number of second repeating units, wherein n:m may be about 1:100 to 2:1, such as about 1:50, 1:30, 1:20, 1:10, 1:5, 1:2, or 1:1.

According to embodiments of the disclosure, the C$_{1-6}$ alkyl group can be linear or branched alkoxy group. For example, the C$_{1-6}$ alkoxy group is methoxy, ethoxy, propoxy, butoxy, pentoxy, hexoxy or an isomer thereof. According to embodiments of the disclosure, the C$_{6-18}$ alkyl group can be linear or branched alkyl group. For example, the C$_{6-18}$ alkyl group can be hexyl, heptyl, octyl, nonyl, decyl, undecyl, dodecyl, tridecyl, tetradecyl, pentadecyl, hexadecyl, heptadecyl, octadecyl, or an isomer thereof. According to embodiments of the disclosure, the C$_{6-22}$ alkenyl group can be linear or branched alkenyl group. For example, the C$_{6-22}$ alkenyl group can be hexenyl, heptenyl, octenyl, nonenyl, decenyl, undecenyl, dodecenyl, tridecenyl, tetradecenyl, pentadecenyl, hexadecenyl, heptadecenyl, octadecenyl or an isomer thereof. According to embodiments of the disclosure, j can be 3, 4, 5, 6, or 7; and, k can be 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30.

According to embodiments of the disclosure, the first repeating unit can be

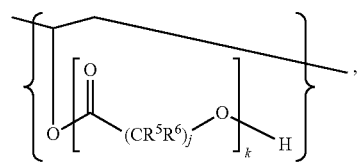

wherein R$^5$ and R$^6$ are independently hydrogen, fluorine, methyl or ethyl; j is 3 to 7; and, k is 1 to 30.

According to embodiments of the disclosure, the weight average molecular weight of the hydrophobic polyvinyl alcohol (PVA) can be 2,000 g/mol to 2,000,000 g/mol, such as about 2,000 g/mol to 1,500,000 g/mol, 10,000 g/mol to 2,000,000 g/mol, 5,000 g/mol to 2,000,000 g/mol 1, 5,000 g/mol to 1,500,000 g/mol, 5,000 g/mol to 1,000,000 g/mol, 8,000 g/mol to 1,000,000 g/mol, or 8,000 g/mol to 500,000 g/mol). The weight average molecular weight (Mw) of the hydrophobic polyvinyl alcohol (PVA) of the disclosure can be determined by gel permeation chromatography (GPC) based on a polystyrene calibration curve.

According to embodiments of the disclosure, the disclosure also provides a device for treating wastewater, in order to remove a pollutant from wastewater. The device for treating wastewater can include the disclosure aforementioned microbial carrier, and a microorganism disposed on the microbial carrier. According to embodiments of the disclosure, the pollutant can be nitrogenous compound, organic matter, or a combination thereof. According to embodiments of the disclosure, the microorganism can be ammonia oxidation bacteria (AOB), anammox bacteria, heterotrophic bacteria, methanogenic bacteria, or a combination thereof. According to embodiments of the disclosure, the device for treating wastewater may have a pollutant removal rate of 50% to 96% within 10 days for treating the wastewater using the device for treating wastewater. Herein, the pollutant removal rate is measured by the influent concentration and effluent concentration of the pollutant.

Below, exemplary embodiments will be described in detail so as to be easily realized by a person having ordinary knowledge in the art. The inventive concept may be embodied in various forms without being limited to the exemplary embodiments set forth herein.

EXAMPLE

Preparation of Hydrophobic Polyvinyl Alcohol (PVA)

Preparation Example 1

One part by weight of polyvinyl alcohol (PVA) (commercially available from Emperor Chemical Co., Ltd. with a trade number of BP-05) and 20 parts by weight of dimethyl sulfoxide (DMSO) were added into a reaction bottle under nitrogen atmosphere. Next, after the reaction bottle was heated to 80° C., polyvinyl alcohol (PVA) was completely dissolved in dimethyl sulfoxide (DMSO), obtaining a solution. After reacting for 30 minutes, ε-caprolactone (10 parts by weight) was added into the reaction bottle, and the reaction bottle was heated to 100° C. After reacting for 24 hours, the reaction bottle was cooled down to 0° C., and the result was subjected to a reprecipitation. The reprecipitation included dissolving the result with acetone (100 parts by weight), and the obtained solution was poured into methanol (1000 parts by weight) to perform the reprecipitation, and the solid was collected. After repeating the aforementioned reprecipitation twice, the obtained result was heated to 80° C. under vacuum and dried for 5 hours, obtaining the hydrophobic polyvinyl alcohol (1).

The measurement results of nuclear magnetic resonance spectrometry of the hydrophobic polyvinyl alcohol (1) are shown below. $^1$H NMR (400 MHz, ppm, CDCl$_3$): 5.12-4.92 (—CH$_2$— connected with ε-caprolactone (PCL), m), 4.12-4.02[—(CO)—CH$_2$CH$_2$CH$_2$CH$_2$CH$_2$O, fifth alkylene group (counted from the carbonyl group of ε-caprolactone (PCL) repeating unit)], 3.70-3.62 [—(CO)—CH$_2$CH$_2$CH$_2$CH$_2$CH$_2$OH, terminal —OH group of PCL repeating unit], 2.35-2.24[—(CO)—CH$_2$CH$_2$CH$_2$CH$_2$CH$_2$O, first alkylene group (counted from the carbonyl group of ε-caprolactone (PCL) repeating unit)], 1.72-1.56[—(CO)—CH$_2$CH$_2$CH$_2$CH$_2$CH$_2$OH, second and fourth alkylene group (counted from the carbonyl group of ε-caprolactone (PCL) repeating unit)], 1.42-1.33 ppm [—(CO)—CH$_2$CH$_2$CH$_2$CH$_2$CH$_2$O, third alkylene group (counted from the carbonyl group of ε-caprolactone (PCL) repeating unit)].

Next, the hydrophobic polyvinyl alcohol (1) was evaluated by Fourier transform infrared spectroscopy (FTIR). The result shown that a larger absorption intensity at 1720 cm$^{-1}$ was observed, and it means that an ester group (containing C=O band) was formed. In addition, an larger absorption intensity at 1639 cm$^{-1}$ was observed, and the absorption intensity was asymmetric stretching vibration of C=O bond in ε-caprolactone. It means that polycaprolactone chain was grafted on the polyvinyl alcohol.

Preparation Example 2

Preparation Example 2 was performed in the same manner as in Preparation Example 1, except that the amount of ε-caprolactone was increased from 10 parts by weight to 20 parts by weight, obtaining hydrophobic polyvinyl alcohol (2).

Next, the melting temperature (Tm) and surface energy of polyvinyl alcohol (PVA) (commercially available from Emperor Chemical Co., Ltd. with a trade number of BP-05), the hydrophobic polyvinyl alcohol (1) and (2) were measured, and the results are shown in Table 1. The melting temperature was measured by differential scanning calorimetry (DSC). The surface energy was determined by measuring the contact angle in use of pure water and formamide and calculating the solid surface energy by wetting tension.

TABLE 1

|  | melting temperature (° C.) | surface energy (mJ/m$^2$) |
|---|---|---|
| polyvinyl alcohol (PVA) | 200 | 58.07 |
| hydrophobic polyvinyl alcohol (1) | 53 | 54.2 |
| hydrophobic polyvinyl alcohol (2) | 53 | 39.0 |

As shown in Table 1, the surface energy of the hydrophobic polyvinyl alcohol (PVA) of the disclosure is lower than the surface energy of the non-modified polyvinyl alcohol (PVA), thus the water resistance of the material was enhanced. In addition, when the surface energy of the carrier was closer to the surface energy of the targeted microorganism, the carrier exhibits higher adhesion of the targeted microorganism. For example, since the surface energy of the ammonia oxidation bacteria (AOB) is about 44.49 mJ/m$^2$, in comparison with the non-modified polyvinyl alcohol (PVA), the lower absolute difference value of the surface energy between the hydrophobic polyvinyl alcohol (PVA) of the disclosure and the ammonia oxidation bacteria (AOB) results in that the carrier exhibits increased adhesion of microorganism. As a result, due to the lower surface energy, the surface of the hydrophobic polyvinyl alcohol (PVA) of the disclosure is suitable for adhesion of ammonia oxidation bacteria (AOB).

Preparation of Microbial Carrier

Example 1

The hydrophobicity polyvinyl alcohol (2) (5 parts by weight), polyethylene glycol (PEG) (commercially available from Emperor Chemical Co., Ltd. with a trade number of PEG polyethylene glycol #400) (1.8 parts by weight), and aliphatic polyisocyanate (commercially available from TRIISO with a trade number of Coronate HXLV) (serving as crosslinking agent) (20 parts by weight) were mixed uniformly, obtaining a mixture. Next, the obtained mixture was heated to 60° C. After stirring for 5 minutes, stannous 2-ethyl-hexanoate (Sn(oct)$_2$) (serving as catalyst) (0.02 parts by weight) was mixed with the result at room temperature. After stirring for 3 minutes, the result was heated to 100° C. After two hours, the result was cooled down to room temperature, obtaining the microbial carrier (1).

Example 2

Example 2 was performed in the same manner as in Example 1, except that the amount of crosslinking agent was reduced (i.e. the ratio of the hydrophobic polyvinyl alcohol (PVA) to the crosslinking agent was greater than about 0.33), obtaining the microbial carrier (2).

Example 3

Example 3 was performed in the same manner as in Example 1, except that the amount of crosslinking agent was increased (i.e. the ratio of the hydrophobic polyvinyl alcohol (PVA) to the crosslinking agent was less than about 0.2), obtaining the microbial carrier (3).

Properties Evaluation of Microbial Carrier

The surface roughness of the hydrophobic polyvinyl alcohol (2) and the microbial carrier (1) of Example 1 was measured, and the results are shown in Table 2. The surface roughness was measured by surface roughness measurement machine (Surfcorder SE1700) via the method according to ASTM D7127-13.

TABLE 2

|  | surface roughness |
| --- | --- |
| Hydrophobic polyvinyl alcohol (2) | ~80.5 ± 7 μm |
| Microbial carrier | ~592.6 ± 142 μm |

As shown in Table 2, in comparison with the hydrophobic polyvinyl alcohol (2), the microbial carrier (1) of Example 1 (prepared by subjecting the hydrophobic polyvinyl alcohol (2) to a chemical foaming in the presence of a crosslinking agent) had greatly increased surface roughness. As a result, when the microorganism is adhered to the carrier at the initial stage, the carrier with high surface roughness can resist the water shear flow, thereby enhancing the microorganism adhesion to the carrier.

The average pore diameter, specific surface area, hardness, and abrasion of the microbial carriers (1)-(3) were measured, and the results are compared to the commercial polyvinyl alcohol (PVA) sponge (commercially available from 3M with a trade number of PN1129) and commercial high density polyethylene (PE) carrier (commercially available from Mutag BioChip with a trade number of Mutag BioChip 30™). The results are shown in Table 3. The average pore diameter and specific surface area are measured by multifunctional 3D XCT (BRUKER SKYSCAN 2211). The hardness (Shore Hardness A) is determined by the method according to ASTM D-2240. The abrasion is determined by the method according to ASTM D4060 (at 1000 cycles, grinding wheel CS-17 mg, and 1000 g weight), in order to measure Taber abrasion resistance.

TABLE 3

|  | polyvinyl alcohol (PVA)sponge (PN1129) | high density polyethylene (PE) carrier (Mutag BioChip 30 ™) | microbial carrier (1) | microbial carrier (2) | microbial carrier (3) |
| --- | --- | --- | --- | --- | --- |
| average pore diameter (μm) | — | — | 302 | 175 | 401 |
| specific surface area (m$^2$/m$^3$) | — | — | 5300 | 5608 | 6324 |
| abrasion (mg/1000 cycles) | — | — | 130 | — | — |
| hardness (Shore A) | 11.4 | 36.0 | 66.2 | — | — |
| porosity (%) | — | — | 34.2 | 25.3 | 56.8 |

As shown in Table 3, in comparison with the polyvinyl alcohol (PVA) sponge and high density polyethylene (PE) carrier, the microbial carrier (1) of Example 1 had a greatly increased hardness. In addition, as shown in Table 3, the average pore diameter, specific surface area, and porosity of the microbial carrier of the disclosure can be modified by adjusting the amount of the crosslinking agent.

Purification Treatment Test of Nitrogen-Containing Compound

Figure 2:
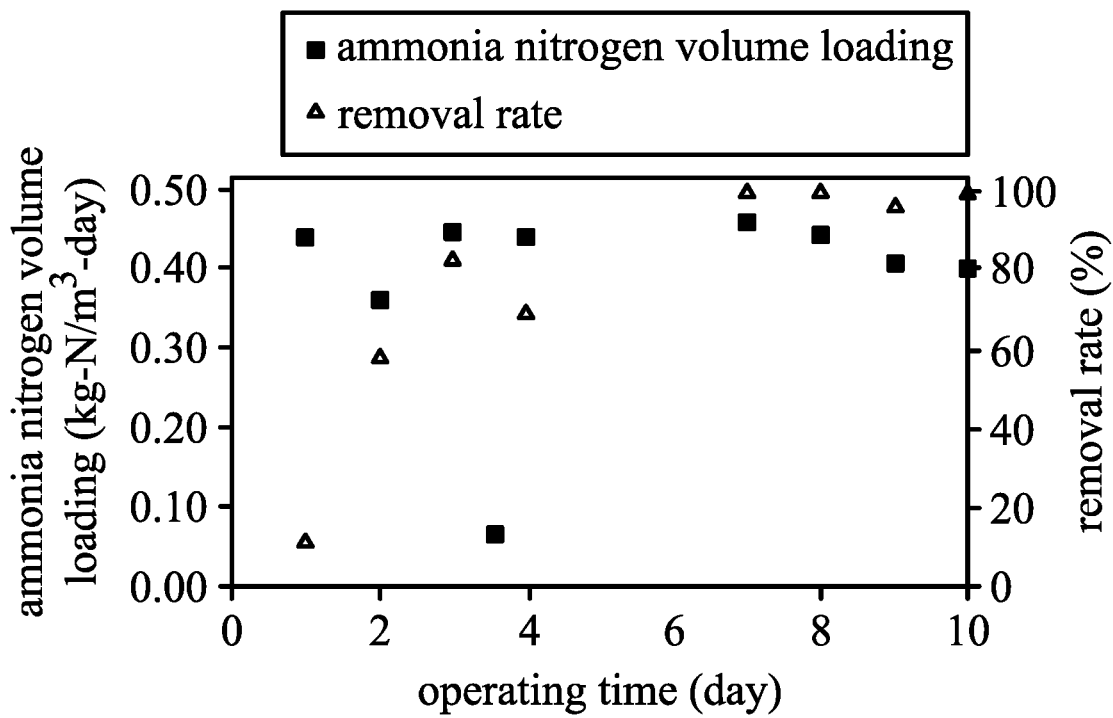
FIG. 2 is a graph plotting the total nitrogen volume loading and the removal rate against operation time of the microbial carrier (1) in Example 1 of the disclosure in the purification treatment test of nitrogen-containing compound.

The total nitrogen removal rate of the microbial carrier (1) of Example 1 was evaluated by subjecting the wastewater having nitrogen-containing compounds (in a specific concentration range) to a purification treatment test with the microbial carrier (1) of Example 1 and determining the nitrogen-containing compound concentration. The results are shown in FIG. 1 and FIG. 2. The conditions of the aforementioned purification treatment test of nitrogen-containing compound are as below. The volume of reaction tank is 3 L, and the filling volume of microbial carrier is 1 L; the ammonia nitrogen concentration in the influent wastewater is in a range from 130 mg/L to 160 mg/L; the hydraulic retention time of the reaction tank is 0.336 days; the pH value of the reaction tank is controlled between 7.5 and 7.9; the selected microorganism is ammonia oxidation bacteria (AOB); the concentration of dissolved oxygen in the reaction tank is maintained at 0.2 mg/L to 0.6 mg/L; and, the ammonia nitrogen concentration is determined by ion chromatography.

As shown in FIG. 1 and FIG. 2, when the microbial carrier of the disclosure is applied in the purification treatment of nitrogen-containing pollutant, the nitrogen-containing pollutant in the wastewater can indeed be removed (the ammonia nitrogen removal rate can reach 77%, and ammonia nitrogen volume loading can be between 0.37 to 0.47).

Analysis of Bacterial Amount

The bacterial amount (total microorganism adhesion, ammonia oxidation bacteria adhesion, and anammox bacteria adhesion after 7 days), surface energy difference, and ammonia oxidation bacteria adhesion of the microbial carrier (1)-(3) and the commercial microbial carrier (Mutag BioChip, HDPE) (with a specific surface area >5,500 m²/m³) against the ammonia oxidation bacteria and anammox bacteria were analyzed, and the results are shown in Table 4. Herein, the total adhesion of microorganism is evaluated by the method for detecting volatile solids in sludge announced by the Environmental Inspection Institute (NIEA R212.02 C). The ammonia oxidation bacteria adhesion and anammox bacteria adhesion are evaluated by real-time PCR to perform the quantitative analysis of microorganism. The surface energy difference is the absolute difference value between the surface energy of the microbial carrier and the surface energy of ammonia oxidation bacteria. And, ammonia oxidation bacteria adhesion on the carrier is determined by detecting the bending deflection of the cantilever (in a µm level) with atomic force microscope (AFM) serving as detection unit.

TABLE 4

| | microbial carrier (1) | microbial carrier (2) | microbial carrier (3) | HDPE microbial carrier |
|---|---|---|---|---|
| total microorganism adhesion ($mg_{vss}/g_{carrier}$) | 30 | 5 | 13 | 2.8 |
| ammonia oxidation bacteria adhesion (Copies/mL) | $3.73 \times 10^8$ | — | — | $5.54 \times 10^6$ |
| anammox bacteria adhesion (Copies/mL) | $1.14 \times 10^6$ | — | — | $<3.47 \times 10^5$ |
| surface energy difference (mJ/m²) | 5.49 | — | — | 14.57 |
| ammonia oxidation bacteria adhesion (nN) | 6.37 | — | — | 2.72 |

As shown in Table 4, in comparison with the commercial HDPE microbial carrier, the microbial carrier of the disclosure had increased adhesion of microorganism on the carrier, and massive amount of ammonia oxidation bacteria and anammox bacteria can adhere on the microbial carrier, resulting from that the microbial carrier of the disclosure is made from the hydrophobicity polyethylene (PE) of the disclosure which has the surface energy close to that of microorganism.

Analysis of Total Nitrogen Degradation Rate

The total nitrogen degradation rate of the microbial carrier (1) of Example 1 and the commercial microbial carrier (Mutag BioChip, HDPE) (with a specific surface area >5,500 m²/m³) was analyzed, and the results are shown in Table 5. The total nitrogen degradation rate was analyzed by the method as disclosed below. A simulated wastewater with a total nitrogen concentration about 60 mg/L was provided, wherein the volume of the wastewater was 250 mL. 8.6 g of the microbial carrier was added into the wastewater. The result was stirred by magnetic stirrer, subjected to time interval sampling within 72 hours, and analyzed by ion chromatography at various time intervals to determine ammonia nitrogen concentration, nitrite nitrogen, nitrate nitrogen concentration. The total nitrogen concentration at various time intervals is calculated by summing up all the concentration. Herein, total nitrogen concentration means total target nitrogen, i.e. the total concentration of ammonia nitrogen, nitrite nitrogen, and nitrate nitrogen.

TABLE 5

| | total nitrogen degradation rate (mg/L*hr) |
|---|---|
| microbial carrier (1) of Example 1 | 0.594 |
| HDPE microbial carrier | 0.0525 |

As shown in Table 5, in comparison with commercial HDPE microbial carrier, the total nitrogen degradation rate of the microbial carrier of the disclosure can be increased by more than 10 times.

Analysis of Total Nitrogen Removal Rate

Figure 3:
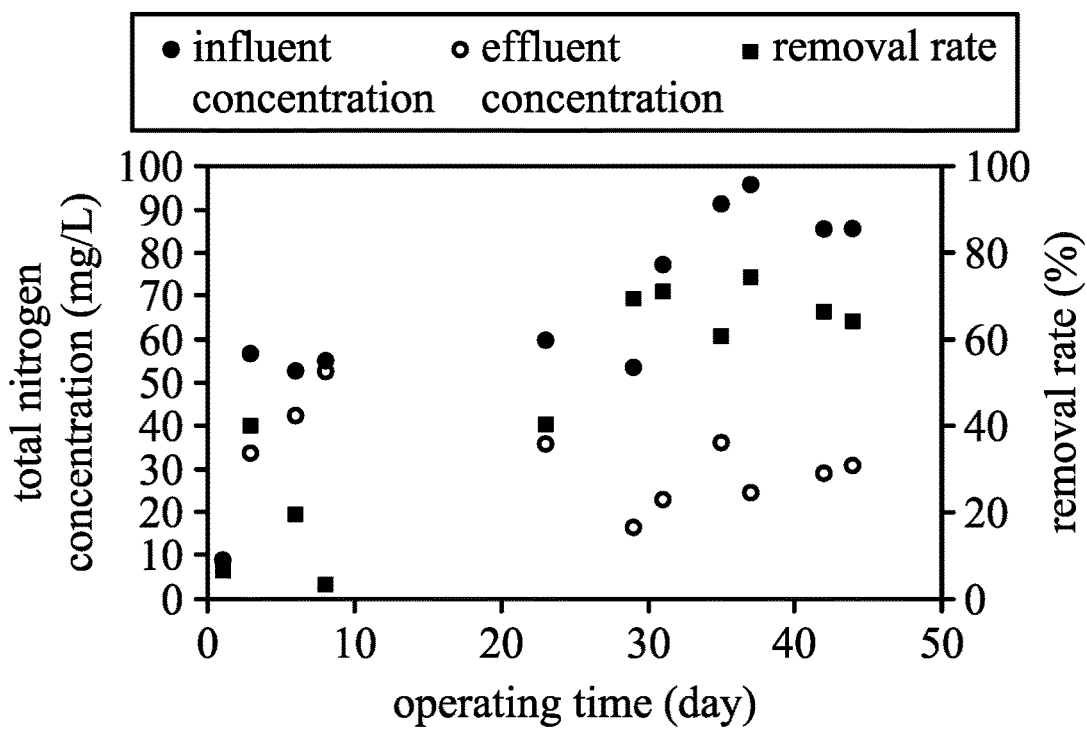
FIG. 3 is a graph plotting the influent concentration, the effluent concentration, and the removal rate against operation time of the microbial carrier (1) in Example 1 of the disclosure in the total nitrogen removal analysis.
Figure 4:
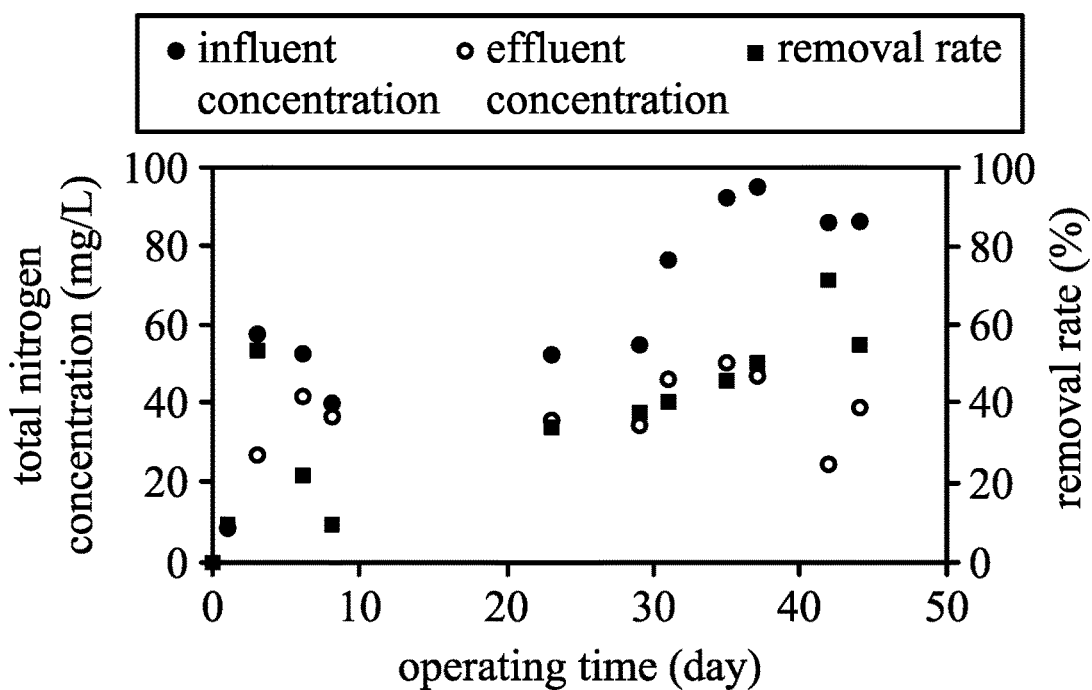
FIG. 4 is a graph plotting the influent concentration, the effluent concentration, and the removal rate against operation time of the commercial HDPE microbial carrier in the total nitrogen removal analysis.

The total nitrogen removal rate of the microbial carrier (1) of Example 1 and the commercial microbial carrier (Mutag BioChip, HDPE) (with a specific surface area >5,500 m²/m³) was analyzed, and the results are shown in FIG. 3 and FIG. 4 respectively. The volume of reaction tank is 3 L, and the filling volume of microbial carrier is 1 L; the total nitrogen concentration in the influent wastewater is in a range from 50 mg/L to 100 mg/L; the hydraulic retention time of the reaction tank is 0.336 days; the pH value of the reaction tank is controlled between 7.5 and 7.9; the selected microorganism is ammonia oxidation bacteria (AOB) and anammox bacteria; the concentration of dissolved oxygen in the reaction tank is maintained at 0.2 mg/L to 0.6 mg/L; and, the total nitrogen concentration is determined by ion chromatography.

As shown in FIG. 3, the average total nitrogen removal rate of the microbial carrier (1) of Example 1 of the disclosure is 67.58% (the measurement time period was 45 days), and the average total nitrogen removal rate of the commercial HDPE microbial carrier is merely 50.01% (the measurement time period was 45 days). In addition, the effluent average total nitrogen concentration of the microbial carrier of Example 1 is 26.55 mg/L which conforms to the regulations (less than 35 mg/L). However, as shown in FIG. 4, the effluent average total nitrogen concentration of the commercial HDPE microbial carrier is 40.07 mg/L which does not conform to the regulations.

Accordingly, the microbial carrier of the disclosure can force the microorganism (such as anammox bacteria and ammonia oxidation bacteria (AOB)) to rapidly adhere on the microbial carrier, thereby enhancing the adhesion of the microorganism on the carrier. As a result, the total nitrogen degradation rate and total nitrogen removal rate of wastewater treatment can be increased when the microbial carrier of the disclosure is used for treating the wastewater.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A microbial carrier, comprising a bacteriophilic material and a plurality of foam cells, wherein the plurality of foam cells is disposed in the bacteriophilic material, wherein the bacteriophilic material is a reaction product of a composition, wherein the composition comprises a hydrophobic polyvinyl alcohol (PVA) and a crosslinking agent, wherein a surface energy of the hydrophobic polyvinyl alcohol is 30 mJ/m² to 58 mJ/m².

2. The microbial carrier as claimed in claim 1, wherein Shore D hardness of the microbial carrier is 50 to 80.

3. The microbial carrier as claimed in claim 1, wherein an average pore diameter of the microbial carrier is 100 μm to 600 μm.

4. The microbial carrier as claimed in claim 1, wherein a porosity of the microbial carrier is 25 to 60%.

5. The microbial carrier as claimed in claim 1, wherein a specific surface area of the microbial carrier is 4000 m$^2$/m$^3$ to 7000 m$^2$/m$^3$.

6. The microbial carrier as claimed in claim 1, wherein an abrasion of the microbial carrier is 100 mg/1000 cycles to 200 mg/1000 cycles.

7. The microbial carrier as claimed in claim 1, wherein a microorganic adhesion of the microbial carrier is 8 mg$_{vss}$/g$_{carrier}$ to 50 mg$_{vss}$/g$_{carrier}$.

8. The microbial carrier as claimed in claim 1, wherein a weight ratio of the hydrophobic polyvinyl alcohol (PVA) to the crosslinking agent is 1:9 to 4:6.

9. The microbial carrier as claimed in claim 1, wherein the hydrophobic polyvinyl alcohol (PVA) comprises a first repeating unit and a second repeating unit, wherein the first repeating unit has a structure represented by Formula (I), and the second repeating unit has a structure represented by Formula (II)

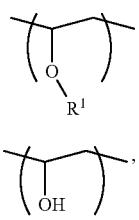

Formula (I)

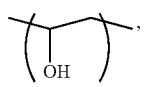

Formula (II)

wherein R$^1$ is —Si(R$^2$)$_3$,

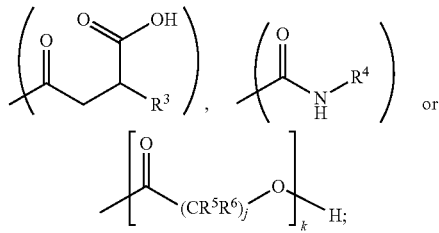

R$^2$ are independently C$_{1-6}$ alkoxy group, C$_{6-18}$ alkyl group, or C$_{6-22}$ alkenyl group, and at least one of R$^2$ is C$_{6-18}$ alkyl group, or C$_{6-22}$ alkenyl group; R$^3$ and R$^4$ are independently C$_{6-18}$ alkyl group, or C$_{6-22}$ alkenyl group; R$^5$ and R$^6$ are independently hydrogen, fluorine, methyl or ethyl; j is 3 to 7; and k is 1 to 30.

10. The microbial carrier as claimed in claim 8, wherein the hydrophobic polyvinyl alcohol (PVA) has n number of first repeating units and m number of second repeating units, wherein n:m is 1:100 to 2:1.

11. The microbial carrier as claimed in claim 8, wherein the first repeating unit is

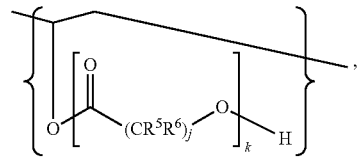

wherein R$^5$ and R$^6$ are independently hydrogen, fluorine, methyl or ethyl; j is 3 to 7; and, k is 1 to 30.

12. The microbial carrier as claimed in claim 1, wherein the crosslinking agent is C$_{1-9}$ aldehyde, aliphatic polyisocyanate, or a combination thereof.

13. The microbial carrier as claimed in claim 1, wherein the crosslinking agent is formaldehyde, acetaldehyde, glyoxal, methylglyoxal, propionaldehyde, acrolein, malondialdehyde, butyraldehyde, valeraldehyde, glutaraldehyde, hexanal, heptaldehyde, benzaldehyde, anisaldehyde, cuminaldehyde or a combination thereof.

14. The microbial carrier as claimed in claim 1, wherein the crosslinking agent is 2,4-toluene diisocyanate, 2,5-toluene diisocyanate, 2,6-toluene diisocyanate, hexamethylene diisocyanate, pentamethylene diisocyanate, isophorone diisocyanate, 4,4'-methylene dicyclohexyl diisocyanate, 4,4'-methylenediphenyl diisocyanate, or a combination thereof.

15. A device for treating wastewater, used to remove a pollutant from wastewater, comprising:
the microbial carrier as claimed in claim 1; and
a microorganism disposed on the microbial carrier.

16. The device for treating wastewater as claimed in claim 15, wherein the pollutant is nitrogenous compound, organic matter, or a combination thereof.

17. The device for treating wastewater as claimed in claim 15, wherein the microorganism is ammonia oxidation bacteria (AOB), anammox bacteria, heterotrophic bacteria, methanogenic bacteria, or a combination thereof.

18. The device for treating wastewater as claimed in claim 15, wherein a pollutant removal rate of the device for treating wastewater is 50% to 96%, within 10 days for treating the wastewater with the device for treating wastewater.

* * * * *